Patented Oct. 30, 1934

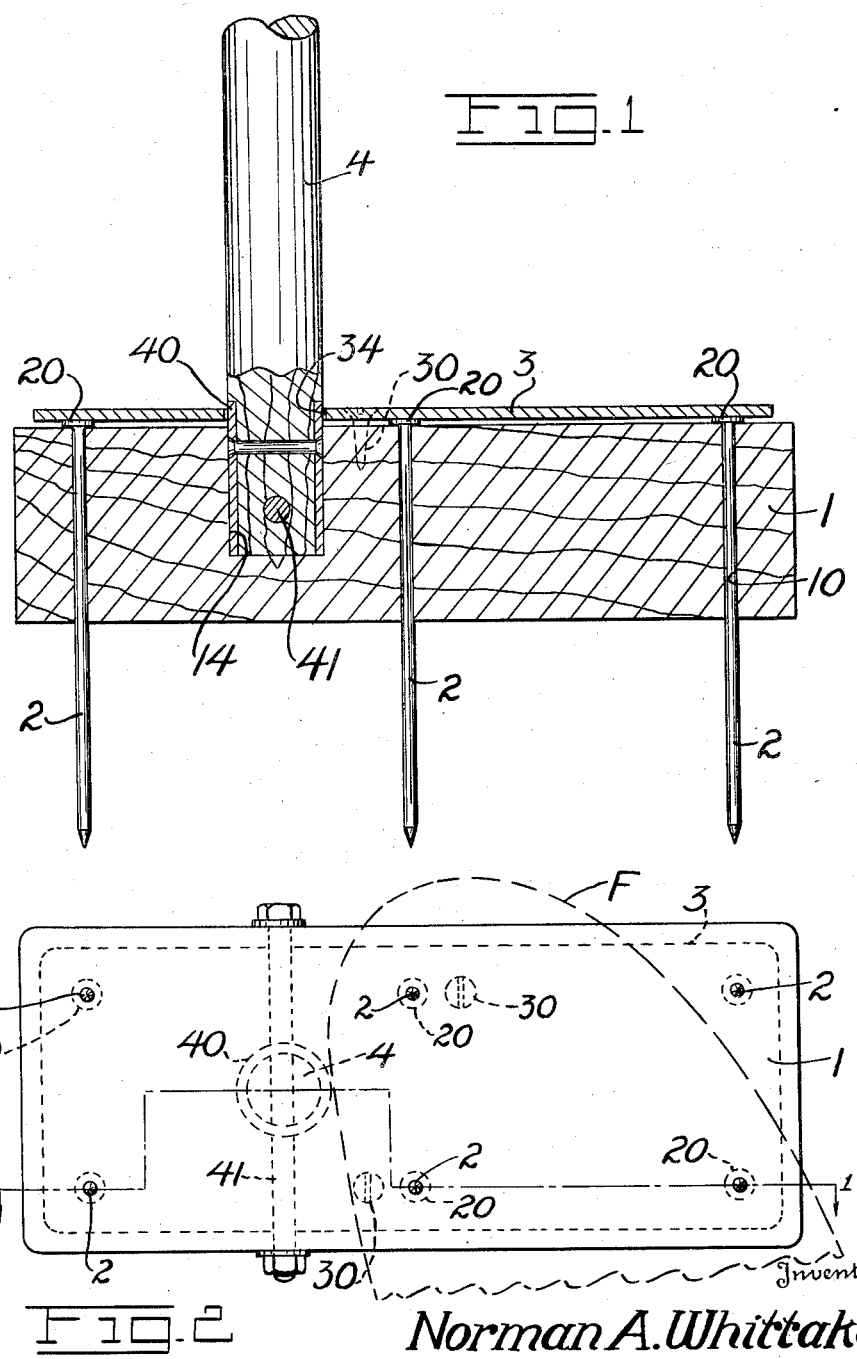

1,978,659

UNITED STATES PATENT OFFICE 1,978,659

GARDENER'S TOOL

Norman A. Whittaker, Seattle, Wash., assignor of one-half to Fred H. Lysons, Seattle, Wash.

Application September 16, 1933, Serial No. 689,762

4 Claims. (Cl. 47—57)

My invention relates to a gardener's tool, particularly to a tool intended primarily for perforating lawns, thereby to permit access of water, fertilizer and the like to the roots of the grass.

It is an object of the invention to devise a tool of this character which is extremely simple and inexpensive to manufacture, and it is a further object to devise such a tool wherein the parts are so arranged that the spikes employed may be forced easily and uniformly into the ground, moving straight downward, to the end that the perforations will be kept uniform in size and the lawn will not be left with unsightly holes.

It is also an object to provide a tool of this character in which it is a simple matter to remove or replace the spikes, and which can thus be employed, upon removal of the spikes, as a tamper.

My invention comprises the novel parts, and the novel combination and arrangement thereof, as shown in the accompanying drawing, described in this specification, and as will be more particularly defined by the claims which terminate the same.

In the accompanying drawing I have shown my invention embodied in a form such as is at present preferred by me, although it will be understood that within the scope of the claims the invention may assume other specific forms.

Figure 1 is a vertical longitudinal section through the block, showing the handle and spikes in elevation.

Figure 2 is an under side plan view of the tool.

A block 1 is provided with a number of perforations 10 extending from the upper to the lower side and substantially uniformly distributed over the under side. These should be directed straight downward. The block is usually of substantially rectangular form, since this offers itself to quantity production in an inexpensive manner, and is also convenient to use. For similar reasons I prefer to make it of wood.

Through the perforations 10 spikes 2 are projected with their heads 20 uppermost. Ordinary long nails may be used for the purpose, and these are readily available to replace bent or lost spikes. Preferably, however, the spikes should be straight sided, so that the holes made by forcing them into the ground will be of uniform size, and so that they will encounter a minimum of resistance in being forced into the ground. To hold the spikes in place in the block I employ a plate 3. While the block is preferably made of wood, the plate 3 is preferably of metal. It overlies the heads 20 of the spikes and prevents their being forced out of the apertures in the block when the spikes are forced into the ground, and it serves as a convenient means of transferring the pressure of the foot on the top of the plate 3 to the several spikes, each loose in its respective aperture. The plate is preferably secured to the block by easily removable means such as the screws 30 passing through the plate and directly received in the block 1.

To control and manipulate the tool I provide a handle 4, which may have a strengthening ferrule 40 at its lower end, if desired. The block 1 is socketed, as illustrated at 14, for the reception of the lower end of the handle 4, and a bolt 41 may be employed, passing through the block and the handle, to secure the handle within its socket. The plate 3 has an aperture 34 which registers with the socket 14, and which is made somewhat larger than the handle, in order that the plate may move freely up and down the handle without binding, in the event it is desired to remove a spike.

It will be observed that the handle is not placed centrally of the block 1, but rather toward one end of the block, to leave the central portion of the block free for the application of the user's foot. The outline of such a foot is illustrated at F in Figure 2, and it will be observed that because of the off-center location of the handle the ball of the foot, which exerts the major portion of the pressure, may be located substantially above the center of the block, thereby pressing downward at the center and forcing all of the equally distributed spikes with the same pressure directly downward into the lawn. This again enables the work to be done with a minimum of force and to leave holes of minimum size.

If it is desired to employ the device as a tamper the plate 3 is raised along the handle, the screws 30 being removed, whereupon the several spikes can be removed from their apertures, and the device is then suitable for use as a tamper.

Water, fertilizer, and the like are given free access to the roots of the grass by using such a perforator, where it will do the most good. If loose dirt tends to fill some holes upon withdrawal of the spikes, these holes of uniform diameter have larger capacity at their lower end than tapered holes of the same volume, hence a given amount of dirt (or fertilizer) will drop lower, or will not fill the hole to as high a level, as would be the case in a tapered hole.

What I claim as my invention is:

1. A gardener's tool comprising a block, spikes projecting downwardly therefrom, and a handle secured to and projecting upwardly from said block, and disposed at one side of the center of said block, whereby the user's foot may be pressed upon the upper side of said block, substantially over the center thereof, to force the spikes into the ground.

2. A gardener's tool comprising a block of generally rectangular form, spikes projecting downwardly from its under side and distributed substantially uniformly about such under side, and a handle projecting upwardly from the block's upper side, and disposed nearer one end of the block than the other, whereby the user's foot may be pressed upon the block's upper side, substantially over the center thereof, to force the spikes uniformly straight downward into the ground.

3. A tool as in claim 2, wherein the spikes are straight-sided, thereby to enter the ground with a minimum of resistance and to leave holes of uniform cross-section when forced straight downward.

4. A gardener's tool comprising a wooden block of generally rectangular form, having generally uniformly distributed perforations from top to bottom, headed spikes passed through such perforations from the top, a plate engaging the heads of such spikes from above to retain them in such perforations, a handle, the upper side of the block being socketed for the reception of said handle, and the plate having an aperture registering with said socket, and of a shape and size in excess of the cross section of said handle, whereby it may move freely lengthwise of the handle to permit replacement or removal of said spikes, to form a tamper, and removable means to normally secure said plate to the block, to retain the spikes in place.

NORMAN A. WHITTAKER.